Figure 1:
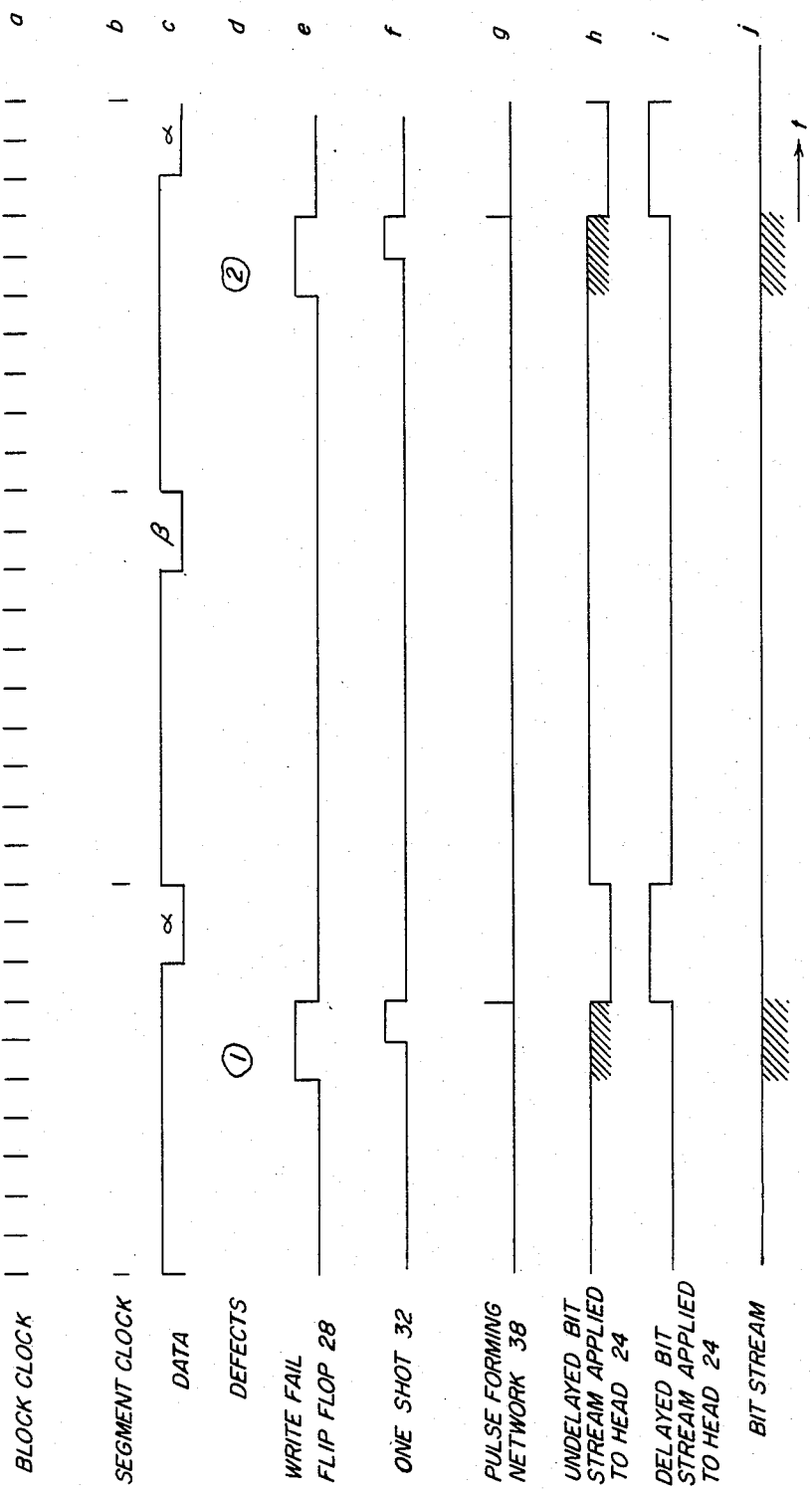

United States Patent [19]

Veillard

[11] Patent Number: 4,494,155
[45] Date of Patent: Jan. 15, 1985

[54] ADAPTIVE REDUNDANCE IN DATA RECORDING

[75] Inventor: Dominique H. Veillard, San Diego, Calif.

[73] Assignee: Eastman Kodak Company, Rochester, N.Y.

[21] Appl. No.: 440,144

[22] Filed: Nov. 8, 1982

[51] Int. Cl.³ .............................................. G11B 5/09
[52] U.S. Cl. ......................................... 360/47; 360/53
[58] Field of Search ........................ 360/47, 53, 54, 24

[56] References Cited

U.S. PATENT DOCUMENTS

| | | | |
|---|---|---|---|
| 2,937,368 | 5/1960 | Newby | 340/174 |
| 2,975,407 | 3/1961 | O'Brien | 340/174.1 |
| 3,080,560 | 3/1963 | Klehm, Jr. et al. | 346/74 |
| 3,187,111 | 6/1965 | Smaller | 179/100.2 |
| 3,488,663 | 1/1970 | Rosenblatt | 346/74 |
| 3,506,814 | 4/1970 | MacDonald et al. | 235/153 |
| 3,517,305 | 6/1970 | Schwartz et al. | 324/34 |
| 3,550,103 | 12/1970 | Cogar | 340/174.1 |
| 3,559,192 | 1/1971 | Schlossbauer | 340/174.1 |
| 3,656,125 | 4/1972 | Kanda et al. | 340/174.1 B |

Primary Examiner—Vincent P. Canney
Attorney, Agent, or Firm—Robert F. Cody

[57] ABSTRACT

The concept of the invention is to format any bit stream which is to be recorded into a succession of data blocks, each of which corresponds lengthwise to at least the length of the largest defect statistically known to exist in the surface. The data blocks are grouped into data segments, with each data segment (1) being of a length corresponding to no more than the minimum length statistically known to exist between defects and (2) comprising (at least) two less data blocks (which shall be hereinafter sometimes referred to as "vacant blocks") than may be accommodated within a data segment. By sensing, during a writing operation, whether data is being effectively written in the magnetic surface in question, any data which fails to get written may be rewritten by utilizing the vacant data blocks: one block per segment will inherently contain "defective" information, and another block thereof will be, per the invention, adapted to record a low frequency flag signal to identify the occurrence of a rewrite operation. Because each data segment is no greater than the minimum spacing between defects, there can be only one defect per segment and, attendantly, the aforementioned rewriting operation may be implemented.

18 Claims, 3 Drawing Figures

ADAPTIVE REDUNDANCE IN DATA RECORDING

BACKGROUND OF THE INVENTION (1) Field of the Invention

This invention relates in general to data recording and, more particularly, to a technique for preventing the loss of data from or during a recording operation.

(2) Description Relative to the Prior Art (Problem)

Technologies which are associated with information recording have made spectacular progress toward tapping the information bearing potential of magnetic surfaces. A roadblock to achieving very short wavelength recording, however, is the occurrence of signal losses associated with small imperfections in such surfaces. When a magnetic surface is used at a conservative recording density, a surface defect seldom results in a loss worse than a burst error of a few bits of digital information. Error correcting codes have been devised to accommodate the occurrence of burst errors. Such codes reconstruct data integrity by using redundant information systematically incorporated into the recording format. The complexity and cost of these methods, however, is exponentially dependent upon the length of the burst errors that they are required to handle. At the present state-of-the-art, the use of large scale integration has made practical the implementation of burst error correcting codes which can correct up to 12 bits of burst errors.

When one records with a very short gap head (a la U.S. Pat. No. 4,302,790) to take advantage of the very short wavelength capability of a high coercivity isotropic magnetic surface, the gain in recording density is so dramatic that the same surface defect—which in the prior art corresponded to, say, a burst error of 12 bits—can now result in a burst error of several hundred bits. Clearly, the recovery from such burst errors is no longer within the realm of practical error correcting codes.

SUMMARY OF THE INVENTION (Problem Solution)

Magnetic surfaces are characterized by the number and size of, as well as the spacing between, surface defects which, statistically, may be found per unit length of the surface in question. In recognition of this fact, the concept of the invention is to format any bit stream which is to be recorded into a succession of data blocks, each of which corresponds lengthwise to at least the length of the largest defect statistically known to exist in the surface. The data blocks are grouped into data segments, with each data segment (1) being of a length corresponding to no more than the minimum length statistically known to exist between defects and (2) comprising (at least) two less data blocks (which shall be hereinafter sometimes referred to as "vacant blocks") than may be accommodated within a data segment. By sensing, during a writing operation, whether data is being effectively written in the magnetic surface in question, any data which fails to get written may be rewritten by utilizing the vacant data blocks: one block per segment will inherently contain "defective" information, and another block thereof will be, per the invention, adapted to record a low frequency flag signal to identify the occurrence of a rewrite operation. Because each data segment is no greater than the minimum spacing between defects, there can be only one defect per segment and, attendantly, the aforementioned rewriting operation may be implemented.

The invention will be further described with reference to the figures of which

Figure 2:
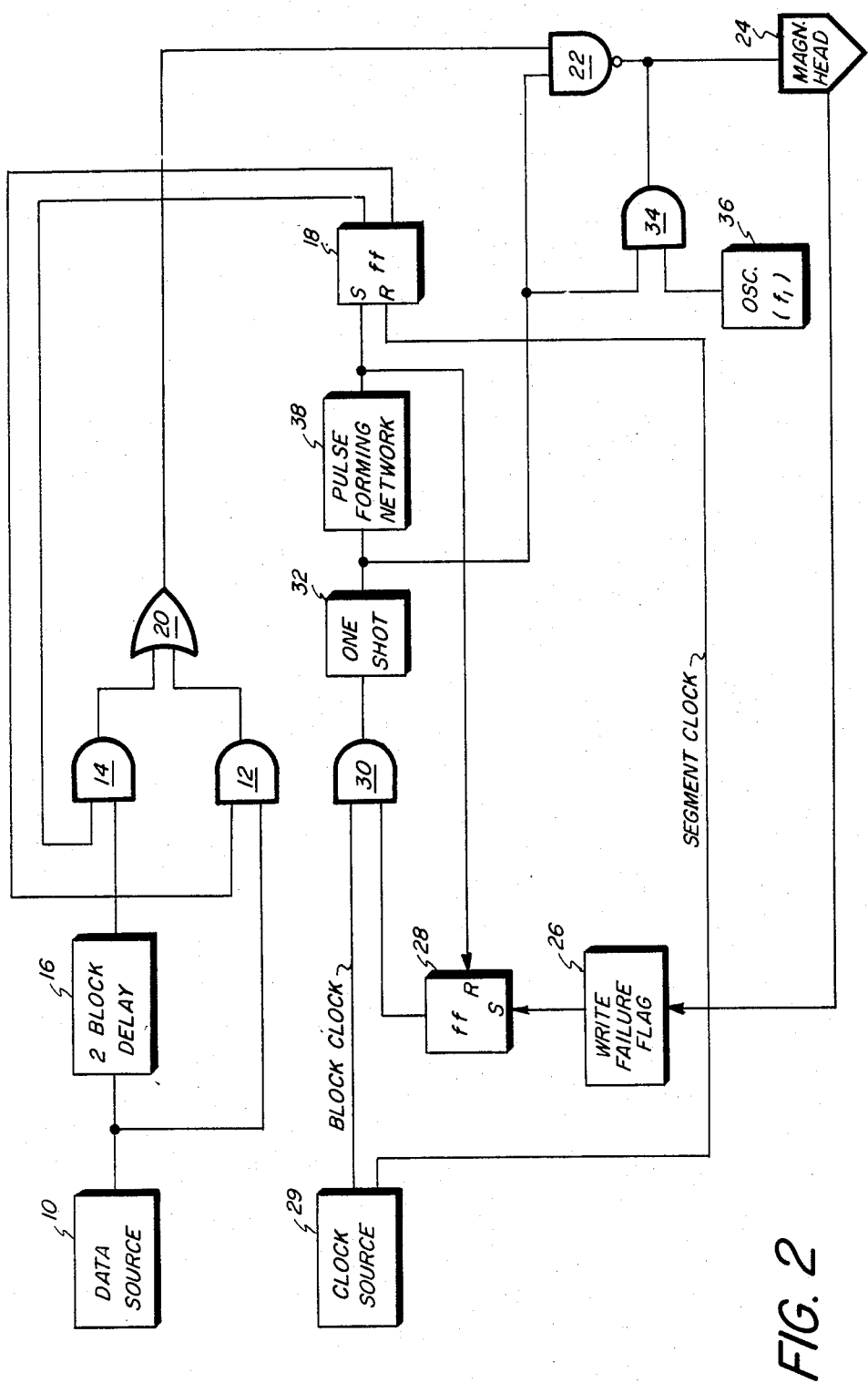
Figure 3:
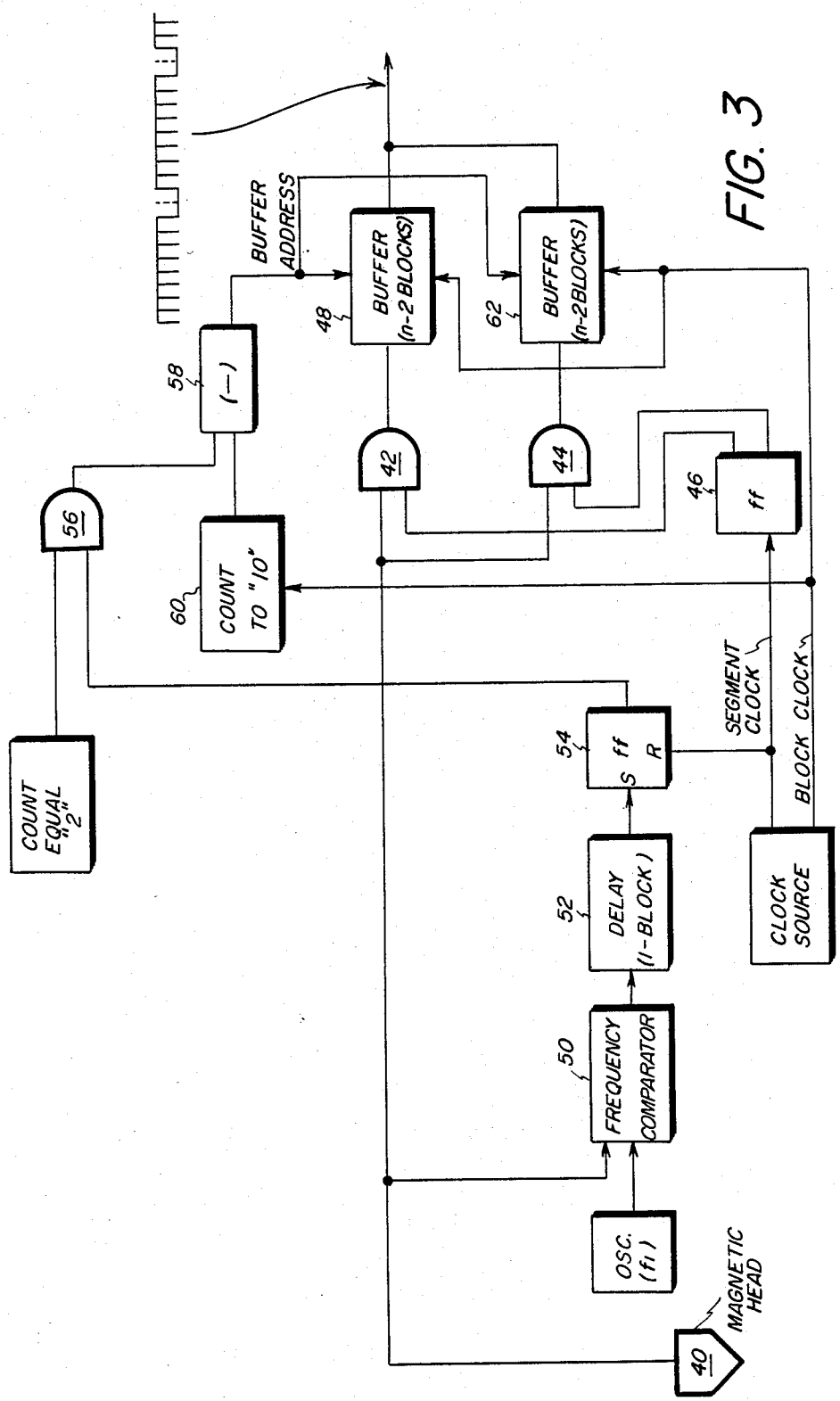

FIG. 1, consisting of a-j, is a series of waveform diagrams useful in describing the concept of the invention, FIG. 2 is a schematic block diagram of data recording apparatus embodying the invention, and FIG. 3 is a schematic block diagram of playback apparatus embodying the invention.

Before beginning a discussion of apparatus for practicing the invention, reference is first made to FIG. 1, diagrams a, b, c, d: Diagram a, FIG. 1, indicates a stream of block clock pulses wherein the pulses are separated by a timewise spacing corresponding to (at least) the statistical maximum lengthwise size of a surface defect in a magnetic surface that is movable, at a nominal rate, relative to a magnetic head. See defect 2 of diagram d, FIG. 1. Defects—according to the strategy of the invention—may be smaller (defect 1, diagram d, FIG. 1) than the block clock pulse spacing (diagram a, FIG. 1), but no larger. Diagram b, FIG. 1, illustrates a segment clock and, pursuant to the invention, the pulses in the segment clock pulse train are separated timewise by no more than the minimum statistical spacing that may occur between defects. Thus, only one defect will occur between any two segment clock pulses . . . there being, in this representative example, 10 block clock pulses per segment. Further pursuant to the invention, data to be recorded is formatted (diagram c, FIG. 1) in such a way that two blocks-worth ($\alpha$, $\beta$, $\gamma$) of the data stream per segment are left vacant of data. It will be understood, of course, that between the time occurrence of any pair of block clock pulses, data in the form of a high density of digital bits will occur.

With the above as background, reference should now be had to the data recording circuit of FIG. 2. Data (diagram c, FIG. 1) from a source 10 is applied directly to a first AND gate 12 . . . and to a second AND gate 14 via a delay device 16 adapted to provide a delay corresponding to the time difference between three successive block clock pulses, i.e. a two-block duration delay. One or the other of the AND gates is toggled into operation by a flip-flop 18 (as will be additionally described later), and their respective output signals are applied via an OR gate 20 and a NAND gate 22 to a magnetic recording head 24.

Given that, during a data recording operation, the magnetic head 24 fails to record data in a magnetic medium cooperative therewith (e.g. because of a surface defect in the magnetic medium) a write failure detection circuit 26 immediately "flags" the occurrence. While such a detection circuit may take a variety of forms, a write failure detection circuit such as that shown and described in IBM's U.S. Pat. No. 2,789,026 is especially suited to the practice of the invention.

In response to the output of the circuit 26, a flip-flop 28 is set (diagram e, FIG. 1); and, when the next occurring block clock pulse is applied to an AND gate 30, a one-shot circuit 32—adapted to produce a square wave pulse having a single block clock duration (diagram f, FIG. 1)—is triggered. The one-shot output pulse of the circuit 32 is applied to an AND gate 34 which, in response thereto, feeds a low frequency flag signal $f_1$, from an oscillator 36, to the magnetic head 24. (A low frequency signal—as opposed to a high frequency one—is applied to the head 24 because of the comparative immunity of low frequency signals to drop outs.) Thus, in response to the aforesaid flag-producing defect, two block clock durations will—during playback—be effectively ignored from a data-processing standpoint: these are (1) the block clock duration that contains (either partially or fully) the defect in question and (2) the block clock duration that contains the low frequency flag signal.

The trailing edge of the one-shot output pulse is converted in a pulse forming network 38 to a spike pulse (diagram g, FIG. 1) for resetting the flip-flop 28 and for setting the flip-flop 18, whereby data which had been delayed for the duration of two block clocks is applied via the gates 20,22 to the magnetic head 24. This therefore means that, up to the end of the block duration following the occurrence of a defect (diagrams d and h, FIG. 1), the gate 12 is in an open state for the processing of data to the magnetic head 24; thereafter, however, the delayed data is processed via the gate 14 (diagram i, FIG. 1) to the magnetic head 24. Reliability in the writing of the delayed data is assured from the fact that, statistically, once a defect occurs within a defined segment, no other defect can occur within that segment; and, therefore, (two) vacant blocks are statistically needed for the rewrite operation only once per segment.

At the end of each segment, a segment clock pulse from the clock source 29 resets the flip-flop 18, whereby undelayed data in the next segment thereof is applied to the magnetic head 24 until (and if) a defect occurs within that segment, at which time delayed data, under control of the "flag", is recorded as substitute data for the defectively recorded data . . . and so on. Attendantly, the (envelope of the) data bit stream applied to the magnetic head 24 will be like that depicted in diagram j, FIG. 1, the crosshatching thereof, indicating the occurrence of defects and corresponding low frequency flags.

To reproduce the data bit stream characterized by diagram c, FIG. 1, from that recorded in the form of diagram j, FIG. 1, a reproduce circuit such as that of FIG. 3 is provided. Although separate and discrete components are—for ease of understanding—indicated for the record and reproduce circuits of FIGS. 2 and 3, it will be readily apparent to those skilled in the art that many of the components thereof may be utilized for both the record and reproduce operations; and that appropriate switching, etc., may be employed to enable given circuit components to be used first one way, and then another. With this caveat in mind, then, reference should be had to FIG. 3 which shows a magnetic playback head 40 applying its output signal (diagram j, FIG. 1) to a pair of AND gates 42 and 44 which are, respectively, under operative control of a flip-flop 46: thus, when one AND gate is opened, the other AND gate is closed, and vice versa. Assuming the AND gate 42 is open, the data signal from the magnetic head 40 is processed through the gate 42 to a buffer 48, e.g. a random access memory (RAM), adapted to store, in this example, eight blocks of data. When, for example, defective data occurs, say, in the sixth data block duration of the first data segment (diagram j, FIG. 1) processed by the magnetic head 40, the low frequency flag signal $f_1$ in the next occurring data block duration (i.e. the seventh data block duration) causes a frequency comparator 50 to apply (immediately) a pulse to a delay device 52. The signal delay of the delay device 52 corresponds to the duration of a single data block; and so, a flip-flop 54 is tripped, in the this example, at the start of the eighth data block.

When the flip-flop 54 is tripped, it causes a count equal to decimal "2" to be gated (AND gate 56) to a subtraction circuit 58 adapted to receive, as a minuend signal, the "block count" of a counter 60 . . . the difference count of the subtraction circuit 58 being an address count applied to the buffer 48. (The counter 60, in this representative example of 10 blocks per segment is adapted to count repeatedly to decimal 10 and then reset to zero.) Therefore, after the buffer 48 is loaded with the data of the first five data blocks of segment 1, it gets momentarily loaded—at addresses 6 and 7 thereof—with defective data and whatever flag noise can pass through the gate 42. Immediately at the start of block duration 8, however, the non-defective data thereof is loaded into the buffer 48 address 6 . . . and similarly the non-defective data of block durations 9 and 10 is loaded into addresses 7 and 8.

With the start of the second data segment, the flip-flop 46 is again tripped to enable the AND gate 44 and thereby cause the data of the second segment to be loaded into a buffer 62 (like the buffer 48) . . . while data is unloaded from the buffer 48. During the second data segment (diagram j, FIG. 1), the defect-free data of the eight data blocks thereof is loaded into the addresses 1 through 8 of the buffer 62 (address counts 9 and 10 being ineffective to cause data to be loaded into the buffer 62). At the start of the third data segment, the flip-flop 46 is again tripped, causing the third segment data to be loaded (i.e. data blocks 1 through 5, and 8 through 10) into the buffer 48, while the data blocks within the buffer 62 are unloaded therefrom, the result being that the combined outputs of the "toggled" buffers will have the form of waveform diagram c, FIG. 1.

In summary then, the invention provides—without special error correction coding—a technique for assuring that data to be recorded in a medium will assuredly get recorded . . . utilizing to advantage the statistical quality of the recording medium to provide a "sliding window" within the medium wherein data which—in the event it fails to get recorded ab initio—may be recorded. In so recording the data in question, a flag signal is provided to identify the occurrence. Attendantly, the data, as recorded, is slightly rearranged from the form that it had originally. In view of the flagging that is employed, however, the data in question is easily reconstituted to its original format.

The invention has been described in detail with particular reference to preferred embodiments thereof, but it will be understood that variations and modifications can be effected within the spirit and scope of the invention.

What is claimed is:

1. Apparatus for assuredly recording source data in a magnetic medium having surface defects therein that are, statistically, no greater than a given length and which are, statistically, separated by more than a certain distance, said data being formatted in segments that, as recorded in said magnetic medium at a nominal recording speed, have lengths that are no greater than the length of said certain distance, each said segment being comprised of said data formatted in blocks thereof, each said data block being of a length, as recorded in said magnetic medium, that is at least as great as said given length, and each said segment, further, having at least two less data blocks per segment than said segment would otherwise be capable of containing, said apparatus comprising (a) magnetic head means,
(b) means for producing a flag signal,
(c) a first data processing path for processing said data,
(d) a second data processing path for processing said data, said second data processing path having, in comparison to that of said first data processing path, means therein for delaying the feedthrough of data therein for a duration corresponding to the time between the start and end of at least two data blocks,
(e) means for producing a write failure signal signifying whether data has been recorded within said magnetic medium, and
(f) switching means cooperative with said means for producing a write failure signal
  (1) for applying the data of said first data processing path to said magnetic head means in the absence of a write failure signal and
  (2) for applying, in response to said write failure signal, said flag signal briefly to said magnetic head means, and thereafter applying the data of said second data processing path to said magnetic head means, whereby, during playback of the data so recorded in said magnetic medium, the format of the data processed by either or both said data processing paths may be reconstituted, said played-back flag signal serving to signify that the recorded data of the data block just preceding the played-back flag signal is defective, but that correct data may be found in the recorded block just following such flag signal.

2. The apparatus of claim 1 including means cooperative with said switching means for assuring that the start of each segment of data is processed via said first signal path.

3. The apparatus of claim 1 wherein each segment of the data to be recorded has two less blocks per segment than said segment would otherwise be capable of containing, and said means for delaying the feedthrough of data through said second data processing path delays said data for a duration corresponding to the time between the start and end of two successive data blocks.

4. The apparatus of claim 1 wherein said switching means is adapted to apply said flag signal to said magnetic head means from the time of occurrence of said write failure signal to the end of the data block following the data block that caused the occurrence of the write failure signal, said switching means being further adapted to apply the data of said second data processing path to said magnetic head means from the instant said flag signal is removed from said magnetic head means.

5. The apparatus of claim 4 including means cooperative with said switching means for assuring that the start of each segment of data is processed via said first signal path.

6. The apparatus of claim 5 wherein each segment of the data to be recorded has two less blocks per segment than said segment would otherwise be capable of containing, and said means for delaying the feedthrough of data through said second data processing path delays said data for a duration corresponding to the time between the start and end of two successive data blocks.

7. The apparatus of claim 6 including playback apparatus for reproducing said source data, said playback apparatus comprising
(a) means for detecting recorded flag signals, and
(b) means responsive to the detection of said flag signals for combining, for each data segment, the data blocks preceding the data block that contains the start of a flag signal with the data blocks following the end of that flag signal.

8. The apparatus of claim 1 wherein said flag signal is a signal having a frequency that is significantly lower than the frequency of bits in said source data.

9. For use with a magnetic medium having defects therein which are, statistically, no greater than a given length and which are each separated by a distance that is, statistically, greater than a certain distance, apparatus comprising
(a) magnetic recording head means,
(b) means for providing source data in blocks thereof which, as recorded in said medium at a nominal recording speed, are at least as long as said given length, said blocks being further arranged in data segments which, as recorded in said medium at said nominal recording speed, have lengths that are no greater than the length of said certain distance, said data being further arranged so that each data segment has at least two blocks per segment that are vacant of data,
(c) means for producing a flag signal,
(d) first and second signal paths for processing therethrough said source data, said second signal path having, in comparison to that of said first signal path, a signal delay therein that corresponds to the time delay between the start and end of at least two successive blocks of data,
(e) means cooperative with said magnetic head means for producing a write failure signal whenever data fails to get recorded in said medium by said magnetic head means, and
(f) switching means
  (1) for applying the data of said first signal path to said magnetic head means in the absence of a write failure signal, and
  (2) for applying, in response to said write failure signal, said flag signal briefly to said magnetic head means, and thereafter applying the data of said second signal path to said magnetic head means, whereby, during playback of the data so recorded by said magnetic head means, the format of said source data may be reconstructed, said flag signal serving to identify that the recorded data of the block just preceding the flag signal is defective, but that correct data may be found in the recorded block just following such flag signal.

10. The apparatus of claim 9 including means cooperative with said switching means for assuring that the start of each segment of data is processed via said first signal path.

11. The apparatus of claim 9 wherein
(a) said means for providing source data is disposed to provide data segments wherein there are two vacant blocks per segment, and
(b) the signal delay provided to said second signal path corresponds to the time delay between the start and end of two successive blocks of data.

12. The apparatus of claim 9 wherein said switching means is adapted to apply said flag signal to said magnetic head means from the time of the occurrence of said write failure signal until the end of the data block following the data block that caused the occurrence of the write failure signal, said switching means being further adapted to apply the data of said second signal path to said magnetic head means from the instant said flag signal is removed from said magnetic head means.

13. The apparatus of claim 12 including means cooperative with said switching means for assuring that the start of each segment of data is processed via said first signal path.

14. The apparatus of claim 13 wherein
(a) said means for providing source data is disposed to provide data segments wherein there are two vacant blocks per segment, and
(b) the signal delay provided to said second signal path corresponds to the time delay between the start and end of two successive blocks of data.

15. The apparatus of claim 14 including playback apparatus for reproducing said source data, said playback apparatus comprising
(a) means for detecting recorded flag signals, and
(b) means responsive to the detection of said flag signals for combining, for each data segment, the data blocks preceding the data block that contains the start of a flag signal with the data blocks following the end of that flag signal.

16. The apparatus of claim 9 wherein said flag signal is a signal having a frequency that is significantly lower than the frequency of bits in said source data.

17. The method of recording information in a magnetic medium having defects therein which are statistically no greater than a given length and which are each separated by a distance that is statistically no less than a certain distance comprising the steps of
(a) arranging said information in blocks thereof which, when recorded in said medium at a nominal recording speed, are at least as long as said given length,
(b) arranging said information blocks into information segments which, when recorded in said medium at said nominal recording speed, have lengths that are no greater than the length of said certain distance, each said information segment being comprised of at least two less information blocks than might be accommodated within said segment, thereby to provide at least two blocks-worth of segment which is vacant of information,
(c) sensing during the recording of each given segment whether, in fact, recording has taken place, and
(d) if recording has not taken place, immediately recording in said medium a flag signal and, thereafter, recording the information which failed to get recorded, utilizing therefor the vacant portions of said given information segment.

18. The method of claim 17 wherein each information segment has precisely two blocks-worth of segment that is vacant of information, and wherein the recording of said flag signal in said medium is for a duration extending to the end of the information block following the information block in which the failure to write occurs.

* * * * *